United States Patent
Gyarmaty

(10) Patent No.: US 6,244,482 B1
(45) Date of Patent: Jun. 12, 2001

(54) TREE TOTE

(76) Inventor: Victor Gyarmaty, R.R. 5 Box 5948, Salorsburg, PA (US) 18353

( * ) Notice: Subject to any disclaimer, the term of this patent is extended or adjusted under 35 U.S.C. 154(b) by 0 days.

(21) Appl. No.: 09/444,129

(22) Filed: Nov. 19, 1999

(51) Int. Cl.[7] .................................................. B60R 9/00
(52) U.S. Cl. ........................ 224/318; 224/324; 224/328; 224/329; 224/330
(58) Field of Search ................................. 224/314, 318, 224/320, 324, 328, 329, 330, 331

(56) References Cited

U.S. PATENT DOCUMENTS

| | | | |
|---|---|---|---|
| 2,196,341 | * 4/1940 | Rush | 224/318 |
| 2,268,881 | * 1/1942 | Le Boeuf | 224/318 |
| 3,000,418 | * 9/1961 | Bitting | 180/53.8 |
| 4,779,779 | * 10/1988 | Haugland | 224/328 |
| 5,096,107 | * 3/1992 | VanSon | 224/328 |
| 5,288,003 | * 2/1994 | MacDonald | 224/328 |
| 5,538,169 | * 7/1996 | Moore | 224/328 |

* cited by examiner

*Primary Examiner*—Stephen K. Cronin
(74) *Attorney, Agent, or Firm*—John D. Gugliotta

(57) ABSTRACT

The invention is a carrying device to be transported on top of vehicles. Specifically, it is a zippered enclosure used to transport baled Christmas trees. It is secured to the top of the vehicle using hooks and adjustable tensioning straps. One places the baled Christmas tree inside the enclosure and zippers it shut. The tote is then placed on top of the vehicle and held in place by tensioning straps with a ratcheting type buckle. The hooks attach to the straps and the roof rack of the vehicle or to the door jambs via special clips.

5 Claims, 5 Drawing Sheets

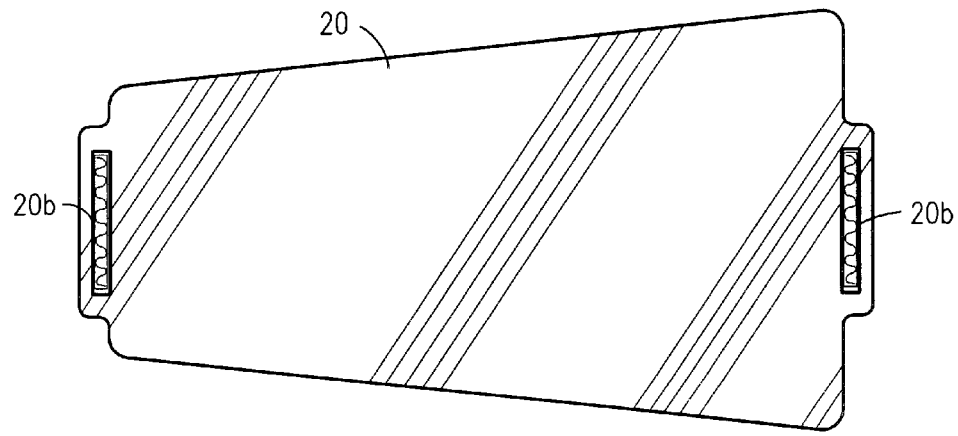
*Figure 8*
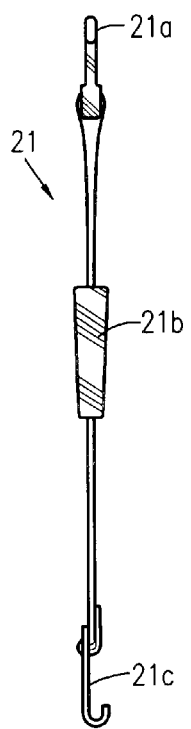 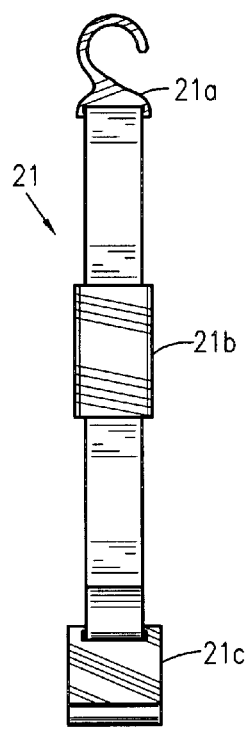 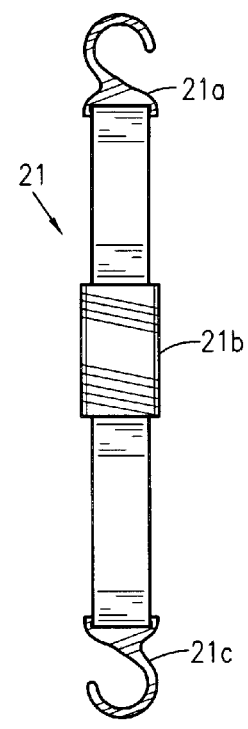
*Figure 9*          *Figure 9a*          *Figure 10*

TREE TOTE

BACKGROUND OF THE INVENTION

1. Field of the Invention

The present invention relates generally to automobile rooftop carriers, racks, containers and the like and, more particularly, to an automobile rooftop tree carrier.

2. Description of the Related Art

As is well-known in the art, many automobile rooftop carriers, racks and containers and the like are known. A search of the prior art did not disclose any patents that read directly on the claims of the instant invention; however, the following references were considered related.

The following patents disclose a support pad assembly for carrying articles on a vehicle roof:

U.S. Pat. No. 5,769,291 issued in the name of Chasan; and

U.S. Pat. No. 5,067,644 issued in the name of Coleman.

The following patents describe an elongated carrier support apparatus for securing items to the roof of a vehicle:

U.S. Pat. No. 5,713,498 issued in the name of Cucci; and

U.S. Pat. No. 5,607,093 issued in the name of Geier.

U.S. Pat. No. 5,884,824 issued in the name of Spring, Jr. discloses an equipment transfer rack for vehicles providing improved load accessibility.

U.S. Pat. No. 5,667,116 issued in the name of Reinhart describes a vehicle rooftop storage unit with a rack portion permanently installed and a container portion.

U.S. Pat. No. 4,632,289 issued in the name of Morrissette discloses a collapsible load carrier for the roof of a vehicle.

U.S. Pat. No. 4,274,569 issued in the name of Winter et al. describes a luggage case securable to the roof of a vehicle.

U.S. Pat. No. 3,209,971 issued in the name of Goodell discloses an automobile top carrier and cases therefor.

While automobile rooftop carriers therein disclosed have features that may be incorporated into this invention as well as in other related references, other elements in combination are different enough as to make the combination distinguished over these related references. Consequently, a need has therefore been felt for an improved but less complex mechanism that aids in the cargoing and transport of cut pine trees.

SUMMARY OF THE INVENTION

Therefore, it is an object of the invention to indicate a device of the type disclosed above which avoids the disadvantages inherent in the state of the art. In particular, the device is to provide an improved automobile rooftop tree carrier.

It is a feature of the present invention to provide an improved automobile rooftop tree carrier to provide a separable lifting enclosure that protect the tree, protects the vehicle surface, as well as provide convenient lifting and lowering of its contents.

Briefly described according to the preferred embodiment of the present invention, an automobile rooftop tree carrier is provided that aids in the transportation of a baled cut evergreen tree atop a motor vehicle. A zippered enclosure, similar in appearance to a large duffel bag, is provided to place the baled or wrapped cut evergreen tree inside of. A separate shield is then placed on the roof of the vehicle to protect it from scratches. Next, the filled enclosure is lifted onto the roof of the vehicle with the aid of four integral handles, two at each end. The bag is secured to the shield through the use of Velcro®. The invention is then secured to the roof with a set of four ratcheting tie-down straps. The tie down straps connect to the bag enclosure through the use of a series of "D" shaped rings located around the perimeter of the bag enclosure. If the motor vehicle is not equipped with a roof rack, an interface clip that attaches to the rain gutter and the ratcheting strap is also provided.

The use of the present invention allows one to easily load, transport and unload Christmas trees and other similar sized objects in with relative ease while protecting the finish of the motor vehicle upon which it is transported.

Other advantages of the present invention are that the present invention protects the tree during transport, it can be used for other similar sized objects as well and provides a separate shield that protects the finish of an automobile roof.

Further, the present invention incorporates four integral handles, two attached at each end, used to lift and lower the bag from automobile roof.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 8 is a top view of a roof shield from an Automobile Rooftop Tree Carrier, according to the preferred embodiment of the present invention;

FIG. 9 is a side view of a doorjamb securing strap for an Automobile Rooftop Tree Carrier, according to the preferred embodiment of the present invention;

FIG. 9a is a front view of a doorjamb securing strap for an Automobile Rooftop Tree Carrier, according to the preferred embodiment of the present invention; and FIG. 10 is a front view of a luggage rack securing strap for an Automobile Rooftop Tree Carrier, according to the preferred embodiment of the present invention.

LIST OF REFERENCE NUMBERS

| | | | |
|---|---|---|---|
| 10 | Automobile Rooftop Tree Carrier | 18 | Handle |
| 15 | Tree Tota | 19 | Compression Strap |
| 15a | Interior Volume | 19a | Receiving Buckles |
| 16 | Zipper | 19b | Adjusting Buckles |
| 17 | Tie Down Strap | 20 | Roof Shield |
| 17a | Retaining Strap | 20a | Hook Fastener Strip |
| 17b | "D" Ring | 20b | Loop Fastener Strip |
| | | 21 | Securing Strap |

DESCRIPTION OF THE PREFERRED EMBODIMENTS

1. Detailed Description of the Figures

Figure 1:
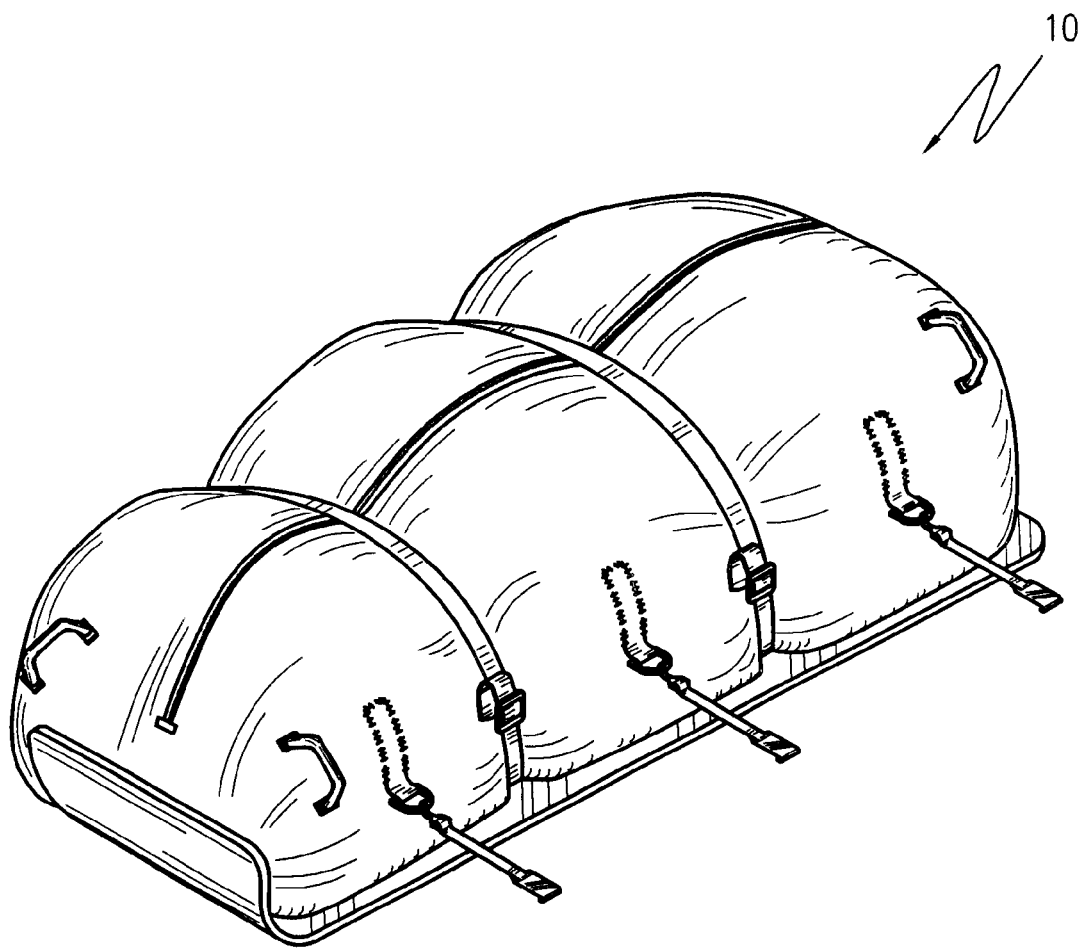
FIG. 1 is a perspective view of an Automobile Rooftop Tree Carrier, according to the preferred embodiment of the present invention.

Referring now to FIG. 1, an Automobile Rooftop Tree Carrier 10 is shown, according to the present invention, designed to carry a freshly cut, baled tree typically purchased just prior to the Christmas celebration for placement and decoration in the home. Such trees are usually of the evergreen or blue spruce variety. As the commercialization of Christmas has continually grown, consumers find it more convenient to purchase a freshly cut tree from mass merchandisers who sell them at discount stores or at roadside stands. As most consumers do not have a truck to transport the tree, it has been the usual practice to tie to the roof of their automobile. To make this task easier, the mass merchandisers have compressed the tree with wire bales significantly reducing the bulkiness of the tree. This has not completely eliminated all of the impracticalities of this practice. Consumers still have to contend with the stiff bristles scratching the roof of their vehicle and being scratched when trying to handle the tree. The many thousands of bristles also tend to start falling out leaving a mess everywhere the tree has been carried. The Automobile Rooftop Tree Carrier eliminates the majority of these problems by providing a self contained rooftop carrier that makes handling the tree easy and eliminates the scratching problem to the automobile rooftop.

Figure 2:
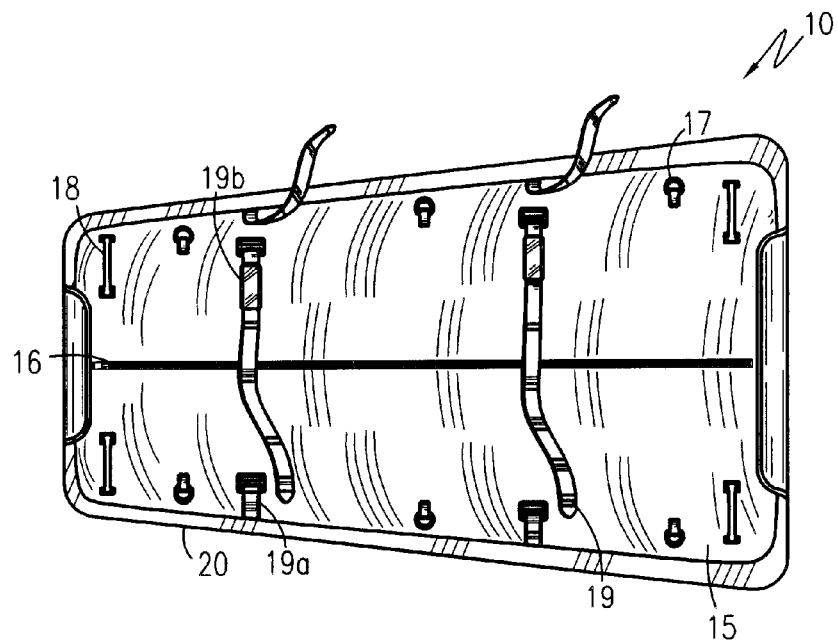
FIG. 2 is a top view of an Automobile Rooftop Tree Carrier, according to the preferred embodiment of the present invention.

Referring now to FIG. 2, an Automobile Rooftop Tree Carrier 10 is shown, comprised of a vinyl or fabric tree tote 15 having an interior volume 15a, which can be sealed shut through a zipper 16 sewn into the top sidewall along the elongated longitudinal axis. Tote 15 has a generally oblong platform gradually expanding from the front edge to the rear edge to mirror the tapered shape of a Christmas tree. Likewise, the width of tree tote 15 gradually increases from the front edge to the rear edge. It is envisioned that at least two different sizes of tree tote 15 would be manufactured for small and large trees. A plurality of at least three tie down straps 17 are provided on the top sidewall on both the left and right edges of tree tote 15. A plurality of at least two compression straps 19 are also located on the upper half of tree tote 15 traversing from a point just beneath the right edge to a point just beneath the left edge. All straps previously referred and hereinbelow are securing straps that are typical made from either vinyl, fabric, or equivalent.

Figure 3:
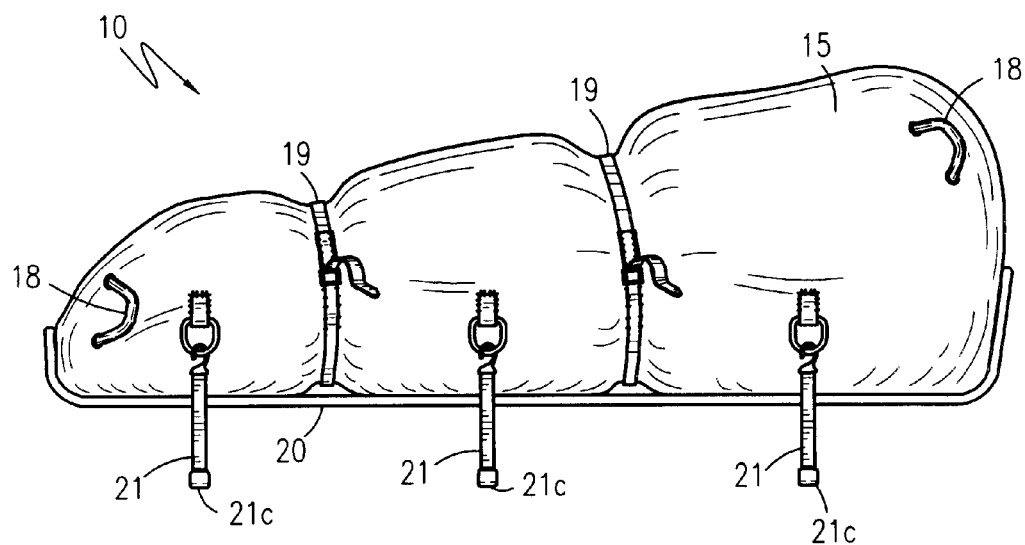
FIG. 3 is a right side view of an Automobile Rooftop Tree Carrier, according to the preferred embodiment of the present invention.
Figure 4:
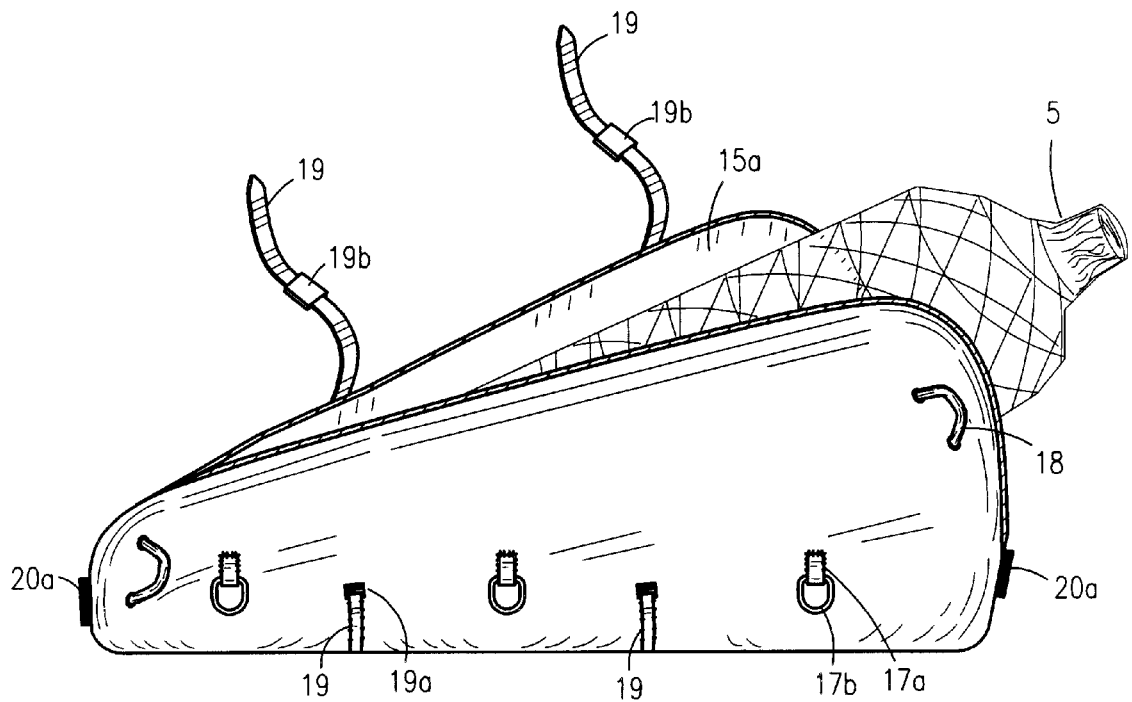
FIG. 4 is a right side view of an Automobile Rooftop Tree Carrier showing how a Christmas tree may be inserted through a zippered opening, according to the preferred embodiment of the present invention.

Referring now to FIG. 3, an Automobile Rooftop Tree Carrier 10 is shown, resting on a roof shield 20, and secured by a plurality of at least securing straps 21 attached on one end to each of the right and left sidewalls of tree tote 15 and on the other end to the luggage carrier on the roof of the vehicle via hooks (not shown) or via special clips 21c to the doorjamb of the vehicle. FIG. 4 shows how a conventional Christmas tree 5 (not part of the disclosure) may be inserted into the interior volume 15a of tree tote 15. Also shown in more detail in this view are the receiving buckles 19a where compression straps 19 are received and secured and the adjustment buckles where their length may be adjusted. Also seen in more detail are tie downs 17 comprised of special "D" rings 17b attached to retaining strap 17a for receiving securing strap 21 described in further detail hereinbelow. Retaining strap 17a is sewn to tree tote 15. Hook fastener strips 20a are fastened to both the front sidewall and rear sidewall for securing roof shield 20 as described further hereinbelow.

Figure 5:
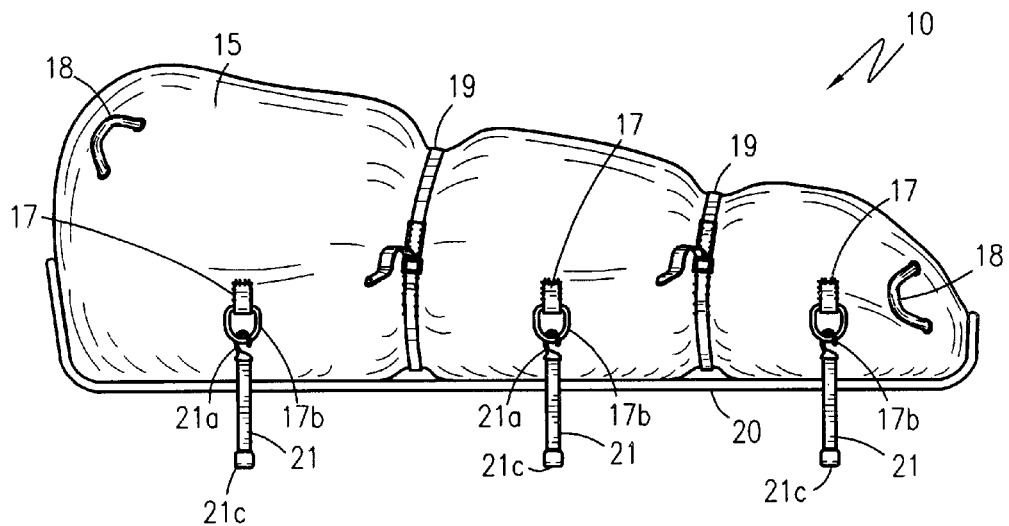
FIG. 5 is a left side view of an Automobile Rooftop Tree Carrier, according to the preferred embodiment of the present invention.

Referring now to FIG. 5, an Automobile Rooftop Tree Carrier 10 is shown, wherein the detail of securing strap 21 securing tree top 15 to the rooftop of a vehicle is shown. Securing strap 21 is of a multi-piece construction having a vinyl coated hook 21a at one end, an adjustment buckle 21b in the middle, and a special vinyl coated door jamb clip 21c at the other end. Securing strap 21 is shown in more detail in FIGS. 9 and 9a. In alternate embodiment, clip 21c is replaced with a vinyl coated hook 21c, as shown in FIG. 10, for clipping the end of securing strap 21 to the luggage rack on the roof of the vehicle eliminating the need to secure it to the door jamb.

Figure 6:
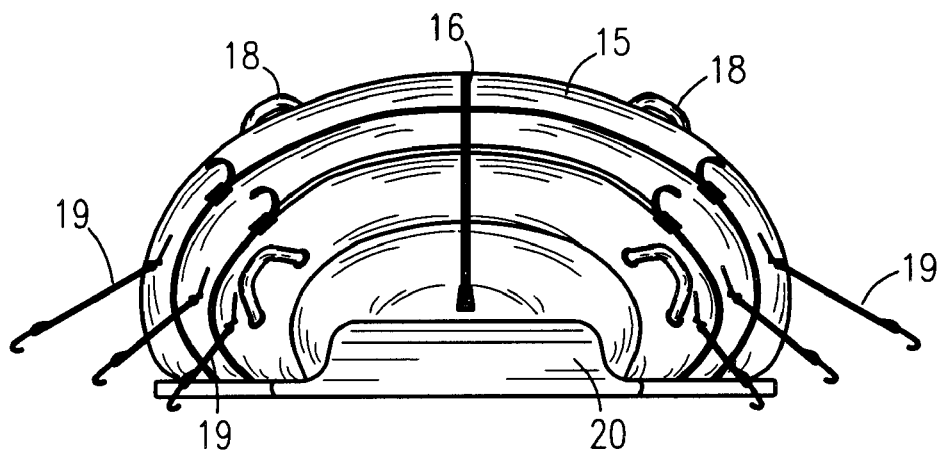
FIG. 6 is a front side view of an Automobile Rooftop Tree Carrier, according to the preferred embodiment of the present invention.
Figure 7:
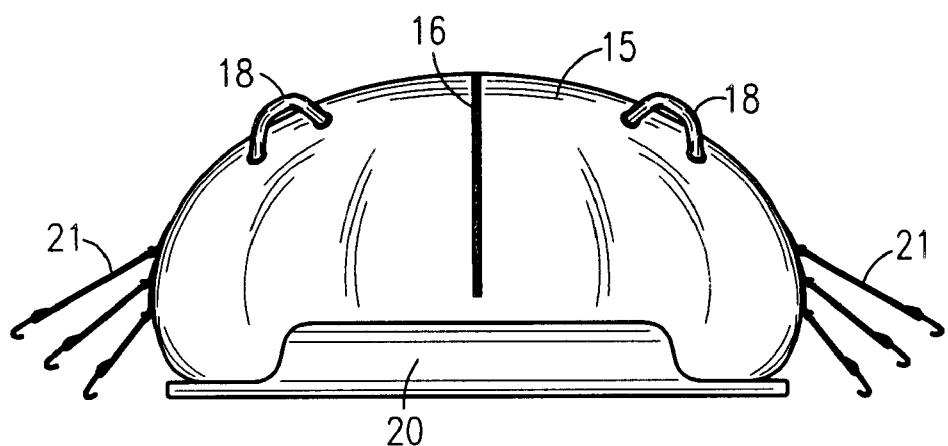
FIG. 7 is a rear view of an Automobile Rooftop Tree Carrier, according to the preferred embodiment of the present invention.

FIG. 6 is a front side view of an Automobile Rooftop Tree Carrier 10, showing the detail of the placement of tie down straps 17 and how they are gradually staggered in height from the front to rear of tree tote 15. Also seen is the placement of roof shield 20 underneath tree tote 15 and wherein a small section on the front of roof shield 20 curls around the front of tree tote 15 and contains a hook fastener strip 20a for mating with loop fastener strip 20b on the front of tree tote 15 previously described. Similarly, a small section of roof shield 20 is curled around the rear edge of tree tote 15 and contains a hook fastener strip 20a for mating with a loop fastener strip 20b located on the rear edge of tree tote 15 as previously described. The placement of loop fastener strips 20b on roof shield 20b can be seen in FIG. 8. The placement of hook fastener strips 20a can be better seen in FIG. 4.

The alternate preferred embodiment securing strap 21 for securing to a vehicle luggage rack can be seen in FIG. 10 comprised of a strap 21 with a first vinyl coated hook 21a at one end, and adjustment buckle 21b in the middle, and a second vinyl coated hook 21c at the other end.

It is envisioned that the tree tote 15 can be rolled up after use and stored along with securing straps 21 in an included fabric tote for storage.

2. Operation of the Preferred Embodiment

To use the present invention, a freshly cut, baled Christmas tree is inserted into the interior volume of a specially designed tree tote. The tote is zipped shut securing the Christmas tree therein. The tote is then placed onto a special mat and secured thereto by use of hook and loop fasteners. The special mat is designed to protect the roof of the vehicle from the harsh tree bristles. The entire assembly is then lifted onto the roof of a vehicle by the use of special handles located on the right and left edges of the tote. The tote then may be secured to the rooftop via "D" rings located along the edges of the tote and securing straps that connect on one end to the "D" rings and on the other end to either the luggage rack of the vehicle or to the vehicle door jambs via special clips. Once at the destination, the securing straps are released and the tote removed from the roof of the vehicle. The tree then may be carried into the home still in the tote. Once inside, the tote is unzipped and the tree removed. The tote may then be rolled up and stored in a special tote designed to store it and the securing straps until the next use.

As designed, a device embodying the teachings of the present invention is easily applied. The foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. Therefore, the scope of the invention is to be broadly limited only by the following claims.

What is claimed is:

1. An automobile rooftop tree carrier comprising:

a pliable tree tote having an interior volume which can be sealed shut through a zipper sewn into a top sidewall along the elongated longitudinal axis, said tote having a generally oblong platform gradually expanding from the front edge to the rear edge to mirror the tapered shape of a Christmas tree such that the width of tree tote gradually increases from a front edge to a rear edge;

securing straps affixed to said toter, wherein said securing straps affixed to said tote comprises plurality of at least three tie down straps affixed on a top sidewall on both a left and a right edge of said tree tote;

attachment means affixed to said securing straps, said attachment means for securing said container to the rooftop of an automobile; and a plurality of at least two compression straps located on the upper half of said tree tote, traversing from a point just beneath the right edge to a point just beneath the left edge.

2. The automobile rooftop tree carrier of claim 1, wherein said compression straps and said tie down strap are made of a material selected from a group comprising vinyl, fabric, leather, and plastic.

3. The automobile rooftop tree carrier of claim 2, wherein said compression straps include:

receiving buckles where said tie down straps are received and secured; and adjustment buckles where their length may be adjusted.

4. An automobile rooftop tree carrier comprising:

collapsible container having an interior cavity for transporting objects on the rooftop of a vehicle;

securing straps affixed to said container;

attachment means affixed to said securing straps, said attachment means for securing said container to the rooftop of an automobile, a retaining strap sewn to said tree tote;

hook fastener strips fastened to both the front sidewall and rear sidewall for securing a roof shield; and a roof shield affixed to said hook fastener strips.

5. An automobile rooftop tree carrier comprising:

collapsible container having an interior cavity for transporting objects on the rooftop of a vehicle;

securing straps affixed to said container;

attachment means affixed to said securing straps, said attachment means for securing said container to the rooftop of an automobile, wherein said tree tote is formed of a material selected from the group comprising vinyl, fabric, leather, and plastic.

* * * * *